Dec. 15, 1953 K. NOWAK 2,662,939

HIGH SELECTIVITY AMPLIFIER

Filed April 2, 1949

INVENTOR
Karl Nowak
BY
[signature]
ATTORNEY

Patented Dec. 15, 1953

2,662,939

UNITED STATES PATENT OFFICE 2,662,939

HIGH SELECTIVITY AMPLIFIER

Karl Nowak, Vienna, Austria

Application April 2, 1949, Serial No. 85,181

1 Claim. (Cl. 179—171)

Figure 1:
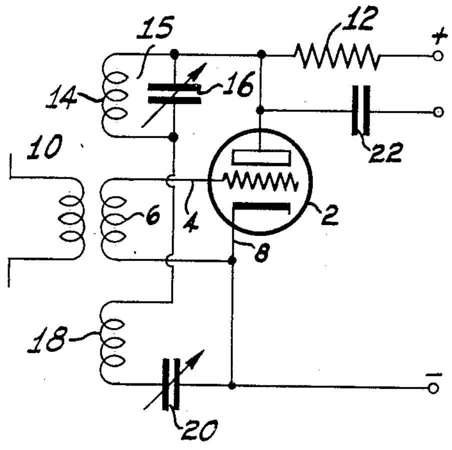

My invention relates to a circuit arrangement that is adapted to receive and amplify electric oscillations with improved sensitivity and selectivity.

The invention is concerned with a means that is adapted to receive or amplify electrical oscillations with increased selectivity in which an oscillatory or tuned circuit that is or may be tuned to incoming frequencies, a regenerative feedback and a degenerative means that is largely an aperiodic in nature are provided, and so connected that, with an increase of the positive feedback voltage or regenerative voltage the negative feedback voltage diminishes and vice versa. The basic idea underlying the invention is that the ratio of the decrease in amplification of the receiver circuit outside resonance to its regeneration or increase in its amplification inside resonance is more than unity, or preferably in the range of ratios between 2 to 1 and 5 to 1.

An arrangement has been previously disclosed in which, by simultaneous use of a positive and a "reciprocal" negative feedback, it is possible to improve the selectivity curve of an individual circuit. Now, in order that the advantages described in this arrangement may also be attained for bandwidth regulation, the coupling coefficient of regeneration and degeneration is made equal. In the light of these disclosures one skilled in the art learns that optimum selectivity is attained by making the coefficients of regeneration and degeneration equal.

However, it has been ascertained that contrary to these teachings the selectivity of such a circuit arrangement may be still further improved if the degenerative effect outside resonance is chosen substantially stronger than the positive regenerative effect inside resonance. According to the invention, the ratio of increase in damping or loss of amplification of the receiver circuits outside resonance to its regeneration or increase in amplification inside resonance is to be fixed at a value that is substantially greater than unity. Instead of the expected reduction in bandwidth of the resonance curve, it has been discovered in testing the circuit arrangement of the invention that under suitably chosen conditions only the lower flanks or sides of the resonance curve are suppressed, and that the central portion of the resonance curve is not distorted. Therefore, one of the advantages derived from the invention is that a single selector circuit may be used to attain a selectivity which is at least equivalent to that secured by the whole series of conventional selective circuits.

Accordingly, it is the object of this invention to improve the sensitivity and selectivity of an amplifier.

Another purpose of the invention is to achieve a greater selectivity and sensitivity by the use of a regenerative and degenerative coupling in which the ratio of the degenerative coupling outside of resonance to the regenerative coupling inside resonance is greater than unity.

A still further object of the invention is to increase the sensitivity and selectivity of a single stage of amplification by use of a tuned regenerative coupling and an aperiodic degenerative coupling.

These and other advantages will be apparent from a detailed consideration of the following discussion in which:

Figure 1 shows a circuit arrangement that is capable of carrying out the teachings of the invention.

Figure 2:
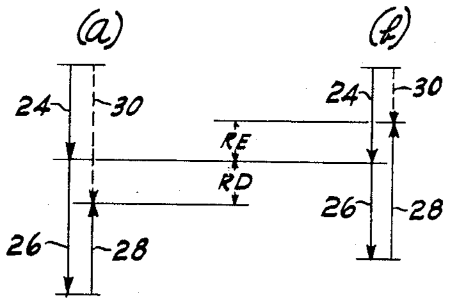

Figure 2*a* is a vector diagram illustrating the effects produced outside resonance when the regeneration and degeneration are made equal.

Figure 2*b* illustrates the vector relationship between the regeneration and degeneration at resonance when the ratio between the regeneration and degeneration is unity.

Figure 3:
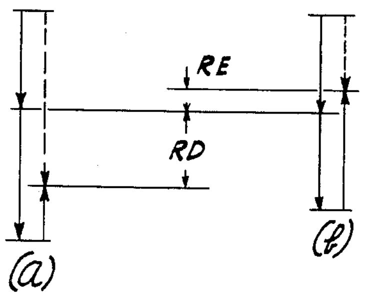

Figure 3*a* shows a vector diagram illustrating the damping effect produced outside resonance when the ratio between degeneration and regeneration is greater than unity.

Figure 4:
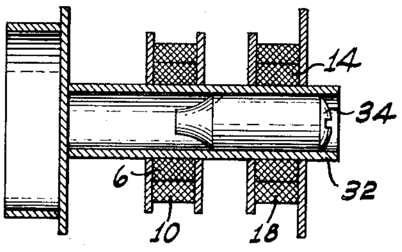

Figure 3*b* shows the regeneration attained at resonance when the ratio between the degeneration and regeneration is greater than unity, and Figure 4 shows a core with the various windings mounted in such a way as to carry out the principles of the invention.

Referring to Figure 1, there is shown a tube or electron discharge device 2 having a grid 4 that is excited by an aperiodic grid coil 6 connected between the grid 4 and cathode 8 of the amplifier 2, the coil being energized from a winding 10 that may in turn be energized from a preceding tube or from an aerial. Included in the plate circuit of the tube 2 is a resistor 12, and, in parallel relationship with the tube there is a series circuit comprising a parallel tuned or oscillation circuit 15 having an inductance or coil 14 and a variable capacitor 16, the tuned circuit and a degenerative coupling coil 18 being in series with variable capacitor 20. The coil 14 of the oscillation or tuned circuit has a regenerative effect on the grid coil 6, while the degenerative coupling coil 18 exercises a damping action upon the grid coil 6. As a result of the series connection of the oscillation circuit 15 and the degenerative coupling coil 18, the effect of the last named degenerative coil inside the range of resonance of the tuned circuit 15 is diminished because in this instance the voltage distribution in this branch of the circuit is shifted in favor of the oscillation circuit 15. Simultaneously, there occurs, in addition, a growth in the regenerative action of coil 14. Outside resonance, however, the regenerative effect of the coil 14 is relatively small because, in accordance with the teachings of the invention, either the number of turns of the decoupling coil 18 is made larger and/or the relative coupling coefficient is higher. The magnitude of both regenerative and degenerative actions can be varied by means of condenser 20. Incoming signal energy of the arrangement is transferred, by way of a coupling condenser 22 to any desired point which may be another amplifier.

In Figures 2*a* and 2*b* there are vectors shown illustrating the negative and positive regeneration effects of the arrangement as shown in Figure 1 and they respectively refer to the case where the tuned circuit 15 is not tuned to the incoming signal, and to a case where the tuned circuit 15 is tuned to the incoming signal. In these diagrams the numeral 24 denotes the normal damping of the grid circuit 6, 26 indicates the aditional damping due to the degenerative coupling coil 18, 28 the regenerative effect of coil 14 and 30 the resultant damping of the grid circuit. The conditions under which the vector relationships shown in Figures 2*a* and 2*b* apply are obtained from my prior inventions, and it is to be noted that the damping indicated by the letters RD and the additional regenerative effect RE are practically equal.

The Figures 3*a* and 3*b* correspond to Figures 2*a* and 2*b* respectively but illustrate the results achieved by employing the teachings of my present invention. It will be noticed that, in this case, the additional damping or degeneration RD outside of resonance is made substantially higher than the additional regeneration effect RE inside resonance.

Figure 4 shows a coil arrangement that may be used to carry out the teachings of the invention. Upon a coil form or support indicated at 32 are placed two separate coils, one of which comprises the windings 6 and 10, that is, the grid coil and energizing coil, while the second coil comprises in super-position the windings 14 and 18 that are used for positive and negative regeneration respectively. Inside the coil body of core 32 there is movably mounted an iron core 34 by which the coupling between the grid coil 6 and the regenerative coils can be altered. By way of example, but not by way of limitation, the following construction data is given in which the input winding 10 has 15 turns, the grid coil 6 has 30 turns, the selective circuit coil 14 100 turns, and the anti-tickler or degenerative coupling coil 18 150 turns or more. The ends of the coils are brought out to soldering tips.

The invention provides ways and means of making it possible to abandon the conventional receiver construction comprising the multiple circuits designed according to the heterodyne principle with intermediate frequency circuits, and to replace even a multi-tube receiver with a single oscillation circuit. This is only possible by virtue of the specific and special selective effect inherent in the circuit arrangement of the invention. If a radio frequency amplifier is used, then the arrangement of the invention is preferably incorporated in the last stage of the radio frequency amplifier or otherwise in the audio frequency or audio leak resistor scheme succeeding it. On the other hand, it may be advantageous in a receiver apparatus of the invention to use a diode or the like for rectification, the diode being maintained inactive by a biasing voltage in the presence of amplitudes falling below a minimum level. In fact, in this manner the selectivity effect here disclosed can be still further enhanced.

If desired, the teachings of the invention may obviously be used in other modifications and combinations. For example, in lieu of an inductive degenerative scheme recourse could be had also to the degenerative coupling predicated upon galvanic resistor means. Or else, either instead of the simple tuned circuit 15 a composite selection means could be employed.

Having disclosed my invention I claim:

A frequency selective amplifying circuit comprising in combination an amplifier having at least a plate, a grid and a cathode, an aperiodic input coil to which signals to be amplified may be coupled, said input coil being connected between said grid and said cathode, a source of positive potential, a load impedance connected between said plate and said source, a parallel resonant circuit comprised of a coil and a condenser connected in parallel, said resonant circuit being tuned to the frequency to be selectively amplified, a series resonant circuit comprised of a coil and a condenser, said series resonant circuit being tuned to the frequency to be selectively amplified, said parallel resonant circuit and said series resonant circuit being connected in series between said plate and said cathode, the coil in said parallel resonant circuit being regeneratively coupled to said input coil and the coil in said series circuit being degeneratively coupled to said input coil.

KARL NOWAK.

References Cited in the file of this patent

UNITED STATES PATENTS

| Number | Name | Date |
|---|---|---|
| 2,115,858 | Keall | May 3, 1938 |
| 2,162,470 | Kautter | June 13, 1939 |
| 2,173,427 | Scott | Sept. 19, 1939 |
| 2,197,239 | Farrington | Apr. 16, 1940 |
| 2,248,763 | Kreienfeld | July 8, 1941 |
| 2,268,672 | Plebanski | Jan. 6, 1942 |
| 2,315,043 | Boucke | Mar. 30, 1943 |
| 2,359,504 | Baldwin | Oct. 3, 1944 |
| 2,439,245 | Dunn | Apr. 6, 1948 |

FOREIGN PATENTS

| Number | Country | Date |
|---|---|---|
| 691,562 | Germany | May 30, 1940 |
| 245,848 | Switzerland | Sept. 1, 1947 |